United States Patent
Bloom et al.

(10) Patent No.: US 12,275,326 B2
(45) Date of Patent: Apr. 15, 2025

(54) VEHICLE SYSTEMS AND METHODS FOR INCREASING ENERGY RESOURCE AVAILABILITY

(71) Applicant: GM GLOBAL TECHNOLOGY OPERATIONS LLC, Detroit, MI (US)

(72) Inventors: Aaron B Bloom, Royal Oak, MI (US); Dave Gerard Rich, Sterling Heights, MI (US); Wing-Fai Ha, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 297 days.

(21) Appl. No.: 18/153,042

(22) Filed: Jan. 11, 2023

(65) Prior Publication Data
US 2024/0227616 A1 Jul. 11, 2024

(51) Int. Cl.
*B60L 55/00* (2019.01)
*B60L 58/12* (2019.01)
*B60L 58/16* (2019.01)

(52) U.S. Cl.
CPC ............. *B60L 55/00* (2019.02); *B60L 58/12* (2019.02); *B60L 58/16* (2019.02); *B60L 2240/545* (2013.01)

(58) Field of Classification Search
None
See application file for complete search history.

(56) References Cited

U.S. PATENT DOCUMENTS

| | | | |
|---|---|---|---|
| 6,909,201 B2 | 6/2005 | Vempaty et al. | |
| 11,327,901 B2 | 5/2022 | Gopalakrishnan et al. | |
| 2010/0102635 A1* | 4/2010 | Chen | H02J 7/1423 307/75 |
| 2013/0289812 A1* | 10/2013 | Anzicek | B60L 3/0046 701/22 |
| 2014/0227568 A1* | 8/2014 | Hermann | H01M 10/6571 429/62 |
| 2016/0023563 A1* | 1/2016 | Wang | B60L 58/24 320/152 |
| 2020/0278936 A1* | 9/2020 | Gopalakrishnan | G06F 1/26 |
| 2024/0042895 A1* | 2/2024 | Kang | B60L 58/24 |

OTHER PUBLICATIONS

Bloom, et al., U.S. Appl. No. 17/401,651, filed Aug. 13, 2021. System and Method for Vehicle Battery Heating.

* cited by examiner

Primary Examiner — Daniel L Greene
(74) Attorney, Agent, or Firm — Lorenz & Kopf LLP (57) ABSTRACT

Vehicles and related systems and methods are provided for managing an electrical system. One method involves identifying a current condition associated with an energy source coupled to an electrical grid, identifying a current operating state associated with the vehicle electrical system, determining an adjusted control target for the energy source to increase availability of the energy source based at least in part on the current condition and the current operating state, identifying a control scheme for the energy source based at least in part on the current condition associated with the energy source, and autonomously operating the vehicle electrical system in a manner that is influenced by the adjusted control target in accordance with the identified control scheme.

20 Claims, 5 Drawing Sheets

VEHICLE SYSTEMS AND METHODS FOR INCREASING ENERGY RESOURCE AVAILABILITY

INTRODUCTION

The technical field generally relates to vehicle systems and more particularly relates to maintaining resource availability in the event of an anomaly during vehicle operation.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

An autonomous vehicle typically includes one or more electrically operated actuator devices to control one or more vehicle features such as, but not limited to, a propulsion system, a transmission system, a steering system, and a braking system. Accordingly, it is desirable to provide a fail operational electrical system capable of prolonging operation of the actuator devices to ensure safety and satisfactory user experiences. Other desirable features and characteristics of the present invention will become apparent from the subsequent detailed description and the appended claims, taken in conjunction with the accompanying drawings and the foregoing introduction.

SUMMARY

Apparatus for a vehicle and related methods for operating a vehicle electrical system are provided. One method of managing a vehicle electrical system involves identifying a current condition associated with an energy source coupled to an electrical grid, identifying a current operating state associated with the vehicle electrical system, determining an adjusted control target for the energy source to increase availability of the energy source based at least in part on the current condition and the current operating state, identifying a control scheme for the energy source based at least in part on the current condition associated with the energy source, and autonomously operating the vehicle electrical system in a manner that is influenced by the adjusted control target in accordance with the identified control scheme. In one aspect, determining the adjusted control target involves determining an adjusted minimum temperature threshold associated with the energy source. In a further aspect, identifying the control scheme involves prioritizing a heating operating mode and autonomously operating the vehicle electrical system involves autonomously operating the energy source in accordance with the heating operating mode to increase a temperature of the energy source using the adjusted minimum temperature threshold. In one aspect, the method further involves selecting one of a balanced heating operating mode and a rapid heating operating mode based at least in part on a number of unavailable battery strings associated with the energy source, wherein autonomously operating the vehicle electrical system involves autonomously operating the energy source in accordance with a selected one of the balanced heating operating mode and the rapid heating operating mode. In another aspect, determining the adjusted control target further involves determining an adjusted state of charge (SOC) target associated with the energy source, and autonomously operating the vehicle electrical system involves autonomously increasing a voltage of the electrical grid based on the adjusted SOC target to increase an SOC of the energy source while autonomously operating the energy source in accordance with the heating operating mode to increase the temperature of the energy source using the adjusted minimum temperature threshold.

In yet another aspect, determining the adjusted control target involves determining an adjusted state of charge (SOC) target associated with the energy source, and autonomously operating the vehicle electrical system involves autonomously operating a power module to increase a voltage of the electrical grid based on the adjusted SOC target to increase an SOC of the energy source. In a further aspect, identifying the control scheme involves selecting one of a balanced heating operating mode and a rapid heating operating mode based at least in part on the current condition associated with the energy source, resulting in a selected heating operating mode, and autonomously operating the vehicle electrical system involves autonomously operating the energy source in accordance with the selected heating operating mode to increase a temperature of the energy source while autonomously operating the power module to increase the voltage of the electrical grid. In another aspect, identifying the current condition associated with the energy source involves a number of unavailable battery strings associated with the energy source. In a further aspect, the energy source is a multiple output dynamically adjustable capacity storage system (MODACS). In another aspect, the method involves automatically deactivating one or more loads coupled to the electrical grid based at least in part on the current condition and the current operating state while autonomously operating the vehicle electrical system in a manner that is influenced by the adjusted control target in accordance with the identified control scheme.

In another aspect, an apparatus is provided for a non-transitory computer-readable medium having executable instructions stored thereon that, when executed by a processor, cause the processor to identify a current condition associated with an energy source coupled to an electrical grid of a vehicle electrical system, identify a current operating state associated with the vehicle electrical system, determine an adjusted control target for the energy source to increase availability of the energy source based at least in part on the current condition and the current operating state, identify a control scheme for the energy source based at least in part on the current condition associated with the energy source, and autonomously operate the vehicle electrical system in a manner that is influenced by the adjusted control target in accordance with the identified control scheme. In one aspect, the adjusted control target is an adjusted minimum temperature threshold associated with the energy source. In a further aspect, the instructions cause the processor to prioritize a heating operating mode and autonomously operate the energy source in accordance with the heating operating mode to increase a temperature of the energy source using the adjusted minimum temperature threshold. In one aspect, the instructions cause the processor to select one of a balanced heating operating mode and a rapid heating operating mode based at least in part on a number of unavailable battery strings associated with the energy source and autonomously operate the energy source in accordance with a selected one of the balanced heating operating mode and the rapid heating operating mode. In another aspect, the instructions cause the processor to determine an adjusted state of charge (SOC) target associated with the energy source and autonomously increase a voltage of the electrical grid based on the adjusted SOC target to increase an SOC of the energy source while autonomously operating the energy source in accordance with the heating operating mode to increase the temperature of the energy source using the adjusted minimum temperature threshold. In another aspect, the instructions cause the processor to determine an adjusted state of charge (SOC) target associated with the energy source and autonomously operate a power module to increase a voltage of the electrical grid based on the adjusted SOC target to increase an SOC of the energy source. In another aspect, the instructions cause the processor to identify a number of unavailable battery strings associated with the energy source, select one of a balanced heating operating mode and a rapid heating operating mode based at least in part on the number of unavailable battery strings associated with the energy source, resulting in a selected heating operating mode, and autonomously operate the energy source in accordance with the selected heating operating mode to increase a temperature of the energy source while autonomously operating the power module to increase the voltage of the electrical grid. In a further aspect, the energy source is a multiple output dynamically adjustable capacity storage system (MODACS).

An apparatus for a vehicle is provided that includes an energy source to provide an electrical grid for a vehicle electrical system, one or more loads coupled to the electrical grid, and a control module coupled to the electrical grid that, by a processor, identifies a current condition associated with the energy source, identifies a current operating state associated with the vehicle electrical system, determines an adjusted control target for the energy source to increase availability of the energy source based at least in part on the current condition and the current operating state, identify a control scheme for the energy source based at least in part on the current condition associated with the energy source, and autonomously operate the vehicle electrical system in a manner that is influenced by the adjusted control target in accordance with the identified control scheme. In one aspect, the energy source is a multiple output dynamically adjustable capacity storage system (MODACS) and the current condition associated with the energy source is a number of unavailable battery strings associated with the MODACS.

BRIEF DESCRIPTION OF THE DRAWINGS

The exemplary aspects will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
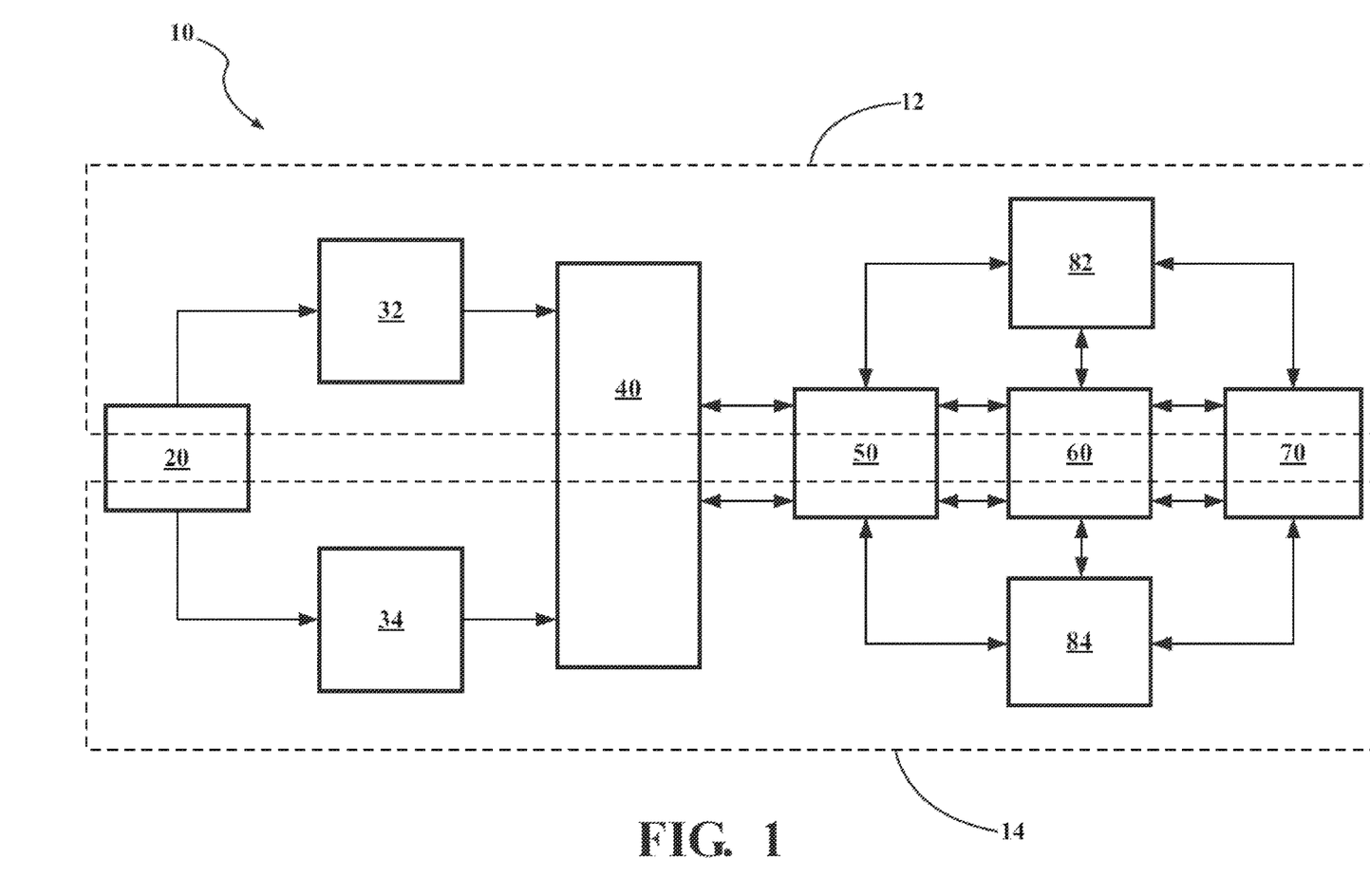
FIG. 1 is a block diagram illustrating an electrical system for a vehicle in accordance with various implementations.

Referring now to FIG. 1, in accordance with one or more implementations, a vehicle electrical system 10 includes a redundant power system including a first grid 12 and a second grid 14, with each grid being independently capable of providing adequate power to operate various electrical loads 50, 60, 70 associated with operating the vehicle.

The illustrated vehicle electrical system 10 includes a battery 20 coupled to a redundant set of accessory power modules (APMs) 32, 34 associated with the respective grids 12, 14 of the redundant power system. In exemplary implementations, the battery 20 is realized as a high voltage (HV) battery that supplies electric power in a suitable voltage range (e.g., 350-800 Volts) to primarily provide power to a vehicle propulsion system.

The APMs 32, 34 generally represent the direct current to direct current (DC-DC) converters or other hardware or circuitry configured to transform electrical energy from the voltage level associated with the HV battery 20 to the respective voltage level associated with the respective grid 12, 14 of the power system. For example, in one exemplary implementation, each of the grids 12, 14 includes a respective power supply rail or bus that is coupled to a respective energy storage element (or battery) 82, 84 associated with the respective grid 12, 14, where the APMs 32, 34 transform the electrical energy from the voltage level associated with the HV battery 20 to the respective voltage level associated with the energy storage elements 82, 84, for example, to supplementally power the loads 50, 60, 70 or provide charging current to the energy storage elements 82, 84. In one implementation, the energy storage elements 82, 84 are realized as 12 Volt lithium-ion batteries to supply power to vehicle systems (e.g., power windows, a climate control system, and the like), where the APMs 32, 34 support the HV battery 20 providing charging power to one or more of the 12 Volt batteries 82, 84, or vice versa, or the 12 Volt batteries 82, 84 may be used to provide boost propulsion power to the vehicle propulsions system. It should be appreciated that the subject matter described herein is not limited to any particular type or combination of voltage levels, or any particular type, number, or configuration of energy storage elements 82, 84 or the electrical grids 12, 14.

The APMs 32, 34 are coupled to the respective power supply rails of the respective grids 12, 14 via a fail operational power module (FOPM) 40. The FOPM 40 includes a switching arrangement and control module useful to coordinate operation of the first grid 12 and the second grid 14, for example, operating both grids interdependently when the systems are operational and operating one grid independently and isolating the other grid when a problem is detected. In this regard, the FOPM 40 includes at least one processor coupled to the switching arrangement and a computer readable storage device or media configurable to support operation of the FOPM 40 in connection with the vehicle electrical system 10 as described herein. The processor can be any custom made or commercially available processor, a central processing unit (CPU), a graphics processing unit (GPU), an auxiliary processor among several processors associated with a controller associated with the vehicle, a semiconductor-based microprocessor (in the form of a microchip or chip set), a macroprocessor, any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions.

The instructions may include one or more separate programs that, when executed by the processor, cause the processor to automatically operate the FOPM as described herein based on the logic, calculations, methods, and/or algorithms embodied by the instructions. In various implementations, the control module of the FOPM 40 may be communicatively coupled to one or more other control modules or other systems onboard the vehicle to communicate commands, signals, data or other information between controllers, such as, for example, a vehicle control module (VCM), a battery control module (BCM) associated with the batteries 82, 84, an engine control module (ECM), and/or the like. Depending on the implementation, the FOPM 40 may be communicatively coupled to a controller area network (CAN), a local interconnect network (LIN), a serial network, wireless network and/or another suitable network and/or interface to communicate with other components onboard the vehicle to support the subject matter described herein.

During normal operation of the redundant power system, the HV battery 20, the APM 32, the FOPM 40, and the 12 Volt battery 82 function as a first grid 12 providing power to a nominal load 50, an auxiliary load 60, and a transient load 70, while the HV battery 20, the APM 34, the FOPM 40, and the 12 Volt battery 84 function as the second grid 14 providing power to the nominal load 50, the auxiliary load 60, and the transient load 70. The nominal load 50 generally represents the primary electrical components or subsystems for the vehicle, such as a power steering pump, a transmission system or other electrically operated actuator devices. The auxiliary load 60 generally represents peripheral devices associated with the vehicle, such as, for example, a climate control system including heating and air conditioning of a vehicle passenger compartment, heated glass, and/or the like. The transient load 70 generally represents time limited device usages or tasks, which may include brief but high-demand spikes in energy usage, such as propulsion boost supplied during rapid vehicle acceleration events or navigation up a steep incline.

In practice, the batteries 82, 84 may include any number of constituent battery cells configured to support or otherwise provide a desired voltage level, current (or power) capacity, and/or energy storage capacity. A battery cell may include a single unit including an anode, a cathode, a membrane, and an electrolyte, wherein the battery cell is capable of receiving electrical energy in a charging mode and is capable of providing electrical energy in a discharge mode. In practice, battery cells may be logically grouped or arranged in strings which can be individually operated independent of one another, where each string has an equal number of battery cells per string. In various implementations, multiple strings may be configured in series or parallel to provide a desired voltage level or current capacity.

As described in greater detail in U.S. patent application Ser. No. 17/401,651, efficient battery operation and reliable operation of a vehicle utilizing stored energy in one or more batteries is temperature dependent. A battery or a plurality of battery cells collectively providing electrical energy within a battery benefit from operation within a desired temperature range. Accordingly, a battery may include a temperature regulation system to remove heat from the battery in a high-temperature condition. Battery heating methods may also be employed, but may include relatively long heating or temperature preparation cycles and fail to warm up the battery in a permissible warm up time. In this regard, a battery cell at a temperature below the desired temperature range or design temperature range for the battery cell typically includes high electrical resistance as compared to the same battery cell operating with the desired temperature range. This high electrical resistance may make delivering full energy discharge of the battery cell inefficient or difficult. Accordingly, targeted discharge commands can be provided to selected battery cells within a vehicle battery to regulate the temperature of the battery to maintain energy discharge capability.

For example, in a first control mode, a control strategy is employed that attempts to equally heat battery cells in a substantially balanced manner at an optimal or selected rate when a rapid drive away event is not anticipated. By utilizing the battery cells in an even manner, the first control mode emulates the firing pattern of a combustion engine alternating activation of cylinders, with equal amounts of discharge and charge time on each battery cell at a defined frequency. Accordingly, for purposes of explanation, the first control mode may alternatively be referred to herein as a balanced heating operating mode.

In a second control mode, a control strategy is employed that attempts to enable rapid and full use of the battery discharging capabilities for important vehicle events or maneuvers in as short of a time as possible by utilizing modulation of battery cells and associated battery cell discharge in a targeted sequence and frequency. This second control mode may utilize super-cell heating or focused module heating, focusing on raising a temperature of a select portion of the battery cells to get those cells up to a desired temperature range quickly rather than raising the temperature of the battery cells uniformly within the battery. The super-cell heating may maintain larger loads on fewer modules for longer to heat them more quickly to ensure a minimum energy and power capability to execute high-severity, degraded state maneuvers. For purposes of explanation, the second control mode may alternatively be referred to herein as a heating operating mode. To avoid premature or disproportionate aging of battery cells, in one or more implementations, which battery cells (or strings) utilized in the rapid heating operating mode may be tracked to rotate or alternate which strings (or portions of the battery cells) are utilized in subsequent instances of the rapid heating operating mode, with a goal of evenly utilizing the battery cells in the rapid heating operating mode over multiple instances of the rapid heating operating mode.

Figure 2:
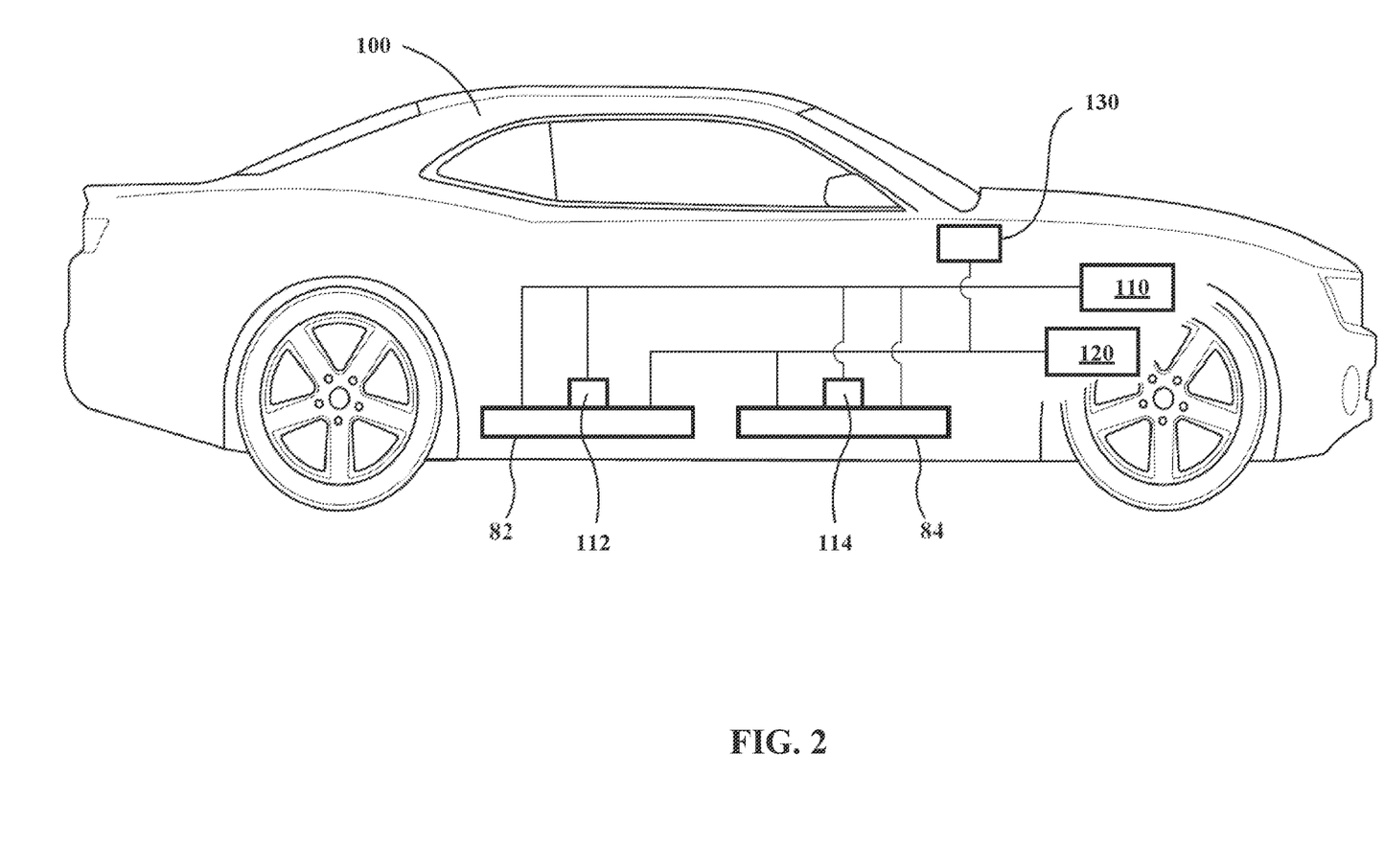
FIG. 2 schematically illustrates an exemplary vehicle incorporating the electrical system of FIG. 1 with a system for vehicle battery heating in accordance with one or more implementations.

FIG. 2 schematically illustrates an exemplary vehicle 100 including a system for vehicle battery heating. The vehicle 100 is illustrated including the first battery 82, the second battery 84, a computerized battery controller 110, a vehicle propulsion system 120, and an auxiliary device 130. The batteries 82, 84 are electrically connected to the vehicle propulsion system 120 and provide electrical energy to generate motive force for the vehicle. The batteries 82, 84 are also electrically connected to the auxiliary device 130 and provide electrical energy to the auxiliary device 130. The auxiliary device may include a heated window unit, a power steering pump, a vehicle headlight, a power window unit, or another similar vehicle device or system. At least one temperature sensor 112 is illustrated monitoring the battery 82, and at least one temperature sensor 114 is illustrated monitoring the battery 84. In one embodiment, the battery cells within the battery 82 and the battery 84 each have a temperature sensor. The temperature sensor 112 and the temperature sensor 114 are in electronic communication with the computerized battery controller 110 and may provide temperature data to the computerized battery controller 110. The computerized battery controller 110 is in electronic communication with the battery 82 and the battery 84, and is operable to selectively energize or deenergize, either in charging mode or discharging mode, each of the battery cells of the battery 82 and the battery 84. The vehicle 100 may include an electronic bus device useful to enable electronic communication between various components of the vehicle 100.

Figure 3:
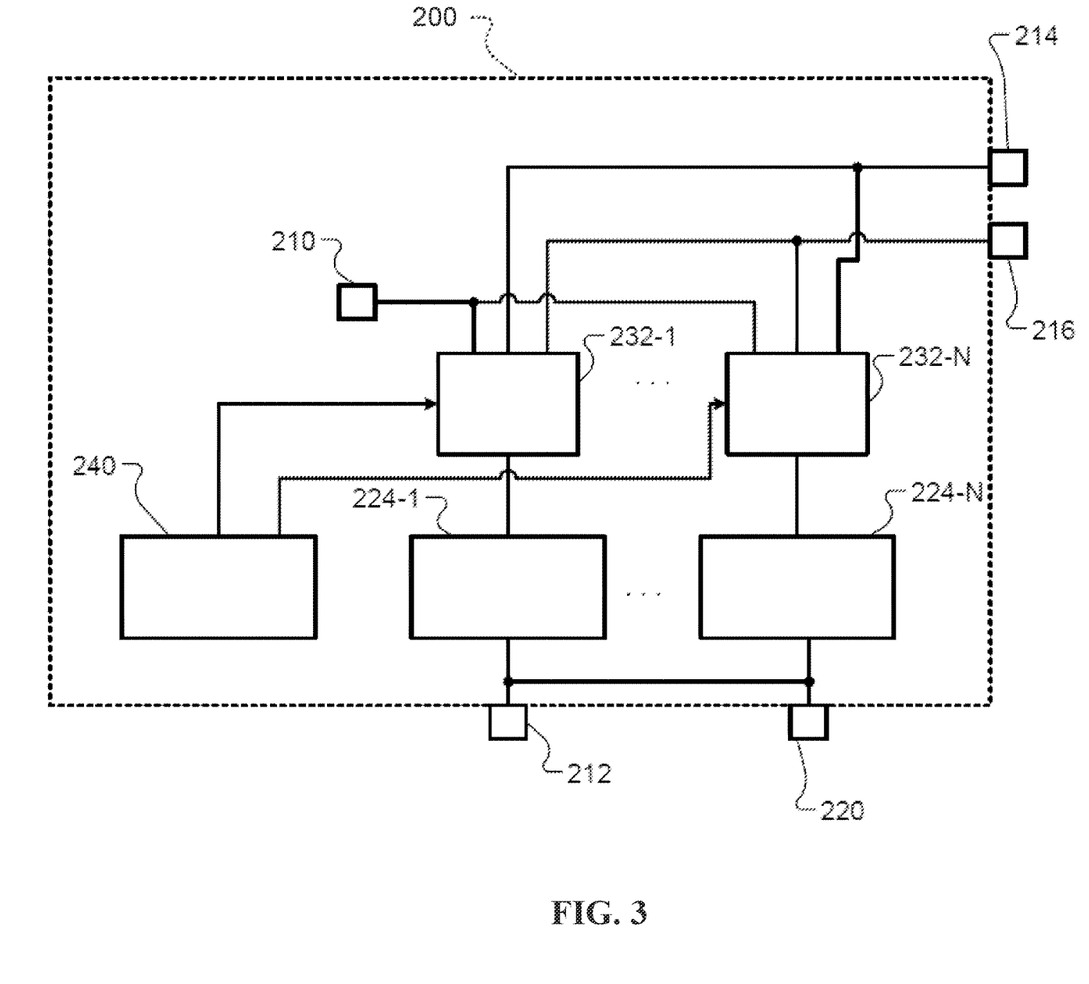
FIG. 3 is a block diagram of a multiple output dynamically adjustable capacity storage system (MODACS) suitable for use in the vehicle electrical system of FIG. 1 in accordance with various implementations.

Referring now to FIG. 3, in some implementations, a multiple output dynamically adjustable capacity storage system (MODACS) 200 may be utilized in the vehicle electrical system 10 in lieu of the different energy storage elements 82, 84. In this regard, FIG. 2 depicts a functional block diagram of the MODACS 200 implemented as a single battery having multiple source terminals. For purposes of explanation, three example source terminals 210, 214, 216 are shown, although any number of source terminals may be included. The source terminals, which may be referred to as positive output terminals, provide respective direct current (DC) operating voltages. The MODACS 200 may include only one negative terminal or may include a negative terminal for each source terminal. For example, the MODACS 200 may have a first positive (e.g., 48 Volt (V)) terminal 210, a first negative terminal 212, a second positive (e.g., a first 12V) terminal 214, a third positive (e.g., a second 12V) terminal 216, and a second negative terminal 220. While the example of the MODACS 200 having a 48V operating voltage and two 12V operating voltages is provided, the MODACS 200 may have one or more other operating voltages, such as only two 12V operating voltages, only two 48V operating voltages, two 48V operating voltages and a 12V operating voltage, or a combination of two or more other suitable operating voltages.

For example, when used in the vehicle electrical system 10 of FIG. 1, a first 12V positive output terminal 214 may be coupled to or otherwise configured to provide the power supply rail for the first grid 12, while a second 12V positive output terminal 216 may be coupled to or otherwise configured to provide the power supply rail for the second grid 14. In this regard, the separate energy storage elements 82, 84 may be absent from the vehicle electrical system 10 in implementations where the MODACS 200 is used in the vehicle electrical system 10 in lieu of the energy storage elements 82, 84, in which case respective output terminals of the MODACS 200 are coupled to or otherwise configured to provide the respective grids 12, 14 of the vehicle electrical system 10.

The MODACS 200 includes cells and/or blocks of cells, such as a first block 224-1 to an N-th block 224-N ("blocks 224"), where N is an integer greater than or equal to 2. Each of the blocks 224 may include one or more cells and may be separately replaceable within the MODACS 200. For example, each of the blocks 224 may be an individually housed 12V DC battery. The ability to individually replace the blocks 224 may enable the MODACS 200 to include a shorter warranty period and have a lower warranty cost. The blocks 224 are also individually isolatable, for example, in the event of a fault in a block. In various implementations, the MODACS 200 may have the form factor of a standard automotive grade 12V battery.

Each of the blocks 224 has its own separate capacity (e.g., in amp hours, Ah). The MODACS 200 includes switches, such as first switches 232-1 to 232-N (collectively "switches 232"). The switches 232 enable the blocks 224 to be connected in series, parallel, or combinations of series and parallel to provide desired output voltages and capacities at the output terminals.

A MODACS control module 240 controls the switches 232 to provide desired output voltages and capacities at the source terminals. The MODACS control module 240 controls the switches 232 to vary the capacity provided at the source terminals based on a present operating mode of the vehicle, as discussed further below. Similar to the FOPM 40, in exemplary implementations, the MODACS control module 240 includes at least one processor configurable to control the switches 232 and a computer readable storage device or media configurable to support operation of the MODACS 200 in connection with the vehicle electrical system 10 as described herein. The processor can be any custom made or commercially available processor, a central processing unit (CPU), a graphics processing unit (GPU), an auxiliary processor among several processors associated with a controller associated with the vehicle, a semiconductor-based microprocessor (in the form of a microchip or chip set), a macroprocessor, any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions. The instructions may include one or more separate programs that, when executed by the processor, cause the processor to automatically operate the switches 232 as described herein based on the logic, calculations, methods, and/or algorithms embodied by the instructions.

In various implementations, the MODACS control module 240 is communicatively coupled to one or more other control modules or other systems onboard the vehicle to communicate commands, signals, data or other information between controllers, such as, for example, a control module associated with the FOPM 40, a VCM, a BCM, an ECM, and/or the like. Depending on the implementation, the MODACS control module 240 may be communicatively coupled to a controller area network (CAN), a local interconnect network (LIN), a serial network, an automotive Ethernet network, a wireless network and/or another suitable network and/or interface to communicate with other components onboard the vehicle to support the subject matter described herein.

Figure 4:
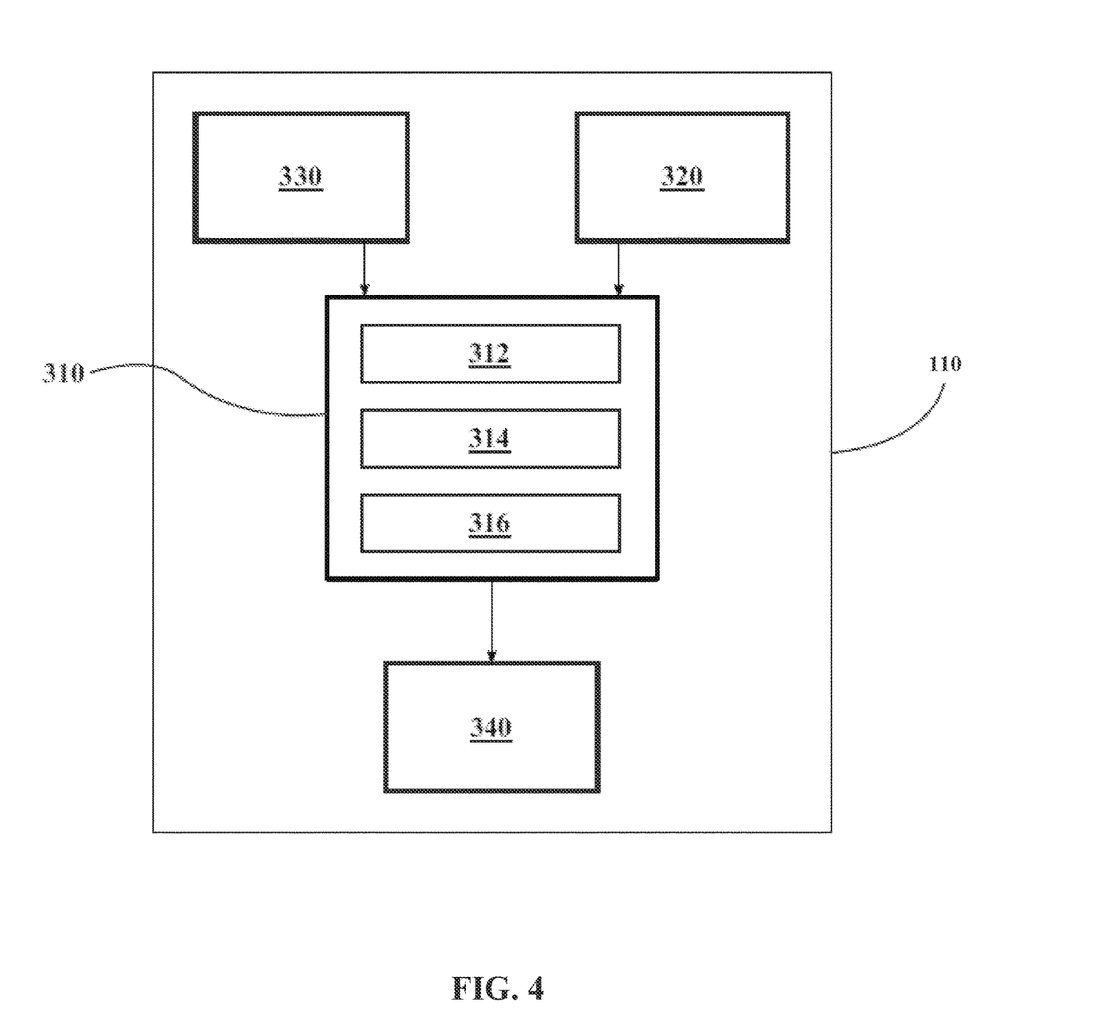
FIG. 4 is a block diagram of a battery controller suitable for use with the electrical system of FIG. 1 in the vehicle of FIG. 2 in accordance with one or more implementations.

FIG. 4 schematically illustrates an exemplary computerized battery controller 110 suitable for use in the vehicle 100 of FIG. 2. Computerized battery controller 110 includes processing device 310, communications device 320, data input output device 330, and memory storage device 340. It is noted that computerized battery controller 110 may include other components and some of the components are not present in some embodiments. The processing device 310 may include memory, e.g., read only memory (ROM) and random-access memory (RAM), storing processor-executable instructions and one or more processors that execute the processor-executable instructions. In embodiments where the processing device 310 includes two or more processors, the processors may operate in a parallel or distributed manner. Processing device 310 may execute the operating system of the computerized battery controller 110. Processing device 310 may include one or more modules executing programmed code or computerized processes or methods including executable steps. Illustrated modules may include a single physical device or functionality spanning multiple physical devices. In the illustrative embodiment, the processing device 310 also includes a battery cell temperature module 312, a heat mode selection and activation module 314, and a battery cell aging mitigation module 316, which are described in greater detail below.

The data input output device 330 is a device that is operable to take data gathered from sensors and devices throughout the vehicle and process the data into formats readily usable by processing device 310. Data input output device 330 is further operable to process output from processing device 310 and enable use of that output by other devices or control modules throughout the vehicle.

The communications device 320 may include a communications/data connection with a bus device configured to transfer data to different components of the system and may include one or more wireless transceivers for performing wireless communication.

The memory storage device 340 is a device that stores data generated or received by the computerized battery controller 110. The memory storage device 340 may include, but is not limited to, a hard disc drive, an optical disc drive, and/or a flash memory drive.

The battery cell temperature module 312 may collect data from batteries, strings within a battery, and/or individual battery cells. The battery cell temperature module 312 may include programming to estimate an amount of heating useful to bring one or more batteries and/or one or more portions of battery cells up from a current temperature to a desired temperature range. The battery cell temperature module 312 may include an inter- and intra-cell temperature model useful to determine the optimal heating rates and duty cycles.

The heat mode selection and activation module 314 may include programming to receive data from devices within or around the vehicle to determine a desired heating mode for the batteries of the vehicle. A navigational touchscreen display within the vehicle may enable a user to program a desired start-up sequence for the vehicle. In the alternative, a portable cellular device of a user may include a computerized application enabling the user to program a desired start-up sequence, for example, at a particular time on selected days of the week or if a battery temperature or ambient temperature is below a threshold value at a particular time. Based upon a desired start-up mode, the heat mode selection and activation module 314 may initiate a first control mode including a distributed energizing pattern within one or more batteries or a second control mode including a focused, block pattern within one or more batteries.

The battery cell aging mitigation module 316 may track and record selective energizing of the various battery cells within batteries of the vehicle. The battery cell aging mitigation module 316 may control which battery cells within the vehicle are selectively energized in subsequent start-up events. By rotating or alternating which battery cells are utilized in start-up events, aging effects upon the battery cells may be distributed and minimized.

Computerized battery controller 110 is provided as an exemplary computerized device capable of executing programmed code to accomplish the methods and processes described herein. A number of different embodiments of computerized battery controller 110, devices attached thereto, and modules operable therein are envisioned, and the disclosure is not intended to be limited to examples provided herein.

Referring to FIG. 2 with continued reference to FIG. 4, in accordance with one or more implementations, during normal operation, the battery controller 110 monitors the temperature of the battery cells in one or more batteries of the vehicle (e.g., via temperature sensors 112, 114), and in response to a request to start the vehicle, the battery controller 110 may determine, based upon the temperature of the battery cells, whether a start-up procedure in accordance with the balanced heating operating mode (for distributed heating of the battery cells) or the rapid heating operating mode (for focused heating of a portion of the battery cells) is to be performed or otherwise executed. When the rapid heating operating mode is selected, a portion of the battery cells for focused heating is selected and the focused heating of the portion of the battery cells is commanded by the battery controller 110 (e.g., via the module 314). Thereafter, the battery controller 110 (e.g., battery cell aging mitigation module 316) monitors the focused heating of the portion of the battery cells to accumulate an aging factor for the battery cells which may be utilized to select a subsequent portion of the battery cells for focused heating in a subsequent instance of the rapid heating operating mode. The rapid heating operating mode may be implemented or performed until a subsequent determination is made to terminate the rapid heating operating mode and/or initiate the balanced heating operating mode. When the balanced heating operating mode is selected during the startup procedure, distributed heating of the battery cells is performed according to the balanced heating operating mode, for example, with alternating battery cells being activated and deactivated. Thereafter, once the battery cells achieve a desired temperature range, for example, by reaching a minimum desired battery cell temperature, the battery controller 110 may terminate the balanced heating operating mode, and for the remainder of vehicle operation, the battery cells may be energized or deenergized according to alternative control methods, such as managing state of charge and delivering desired energy to vehicle systems.

Figure 5:
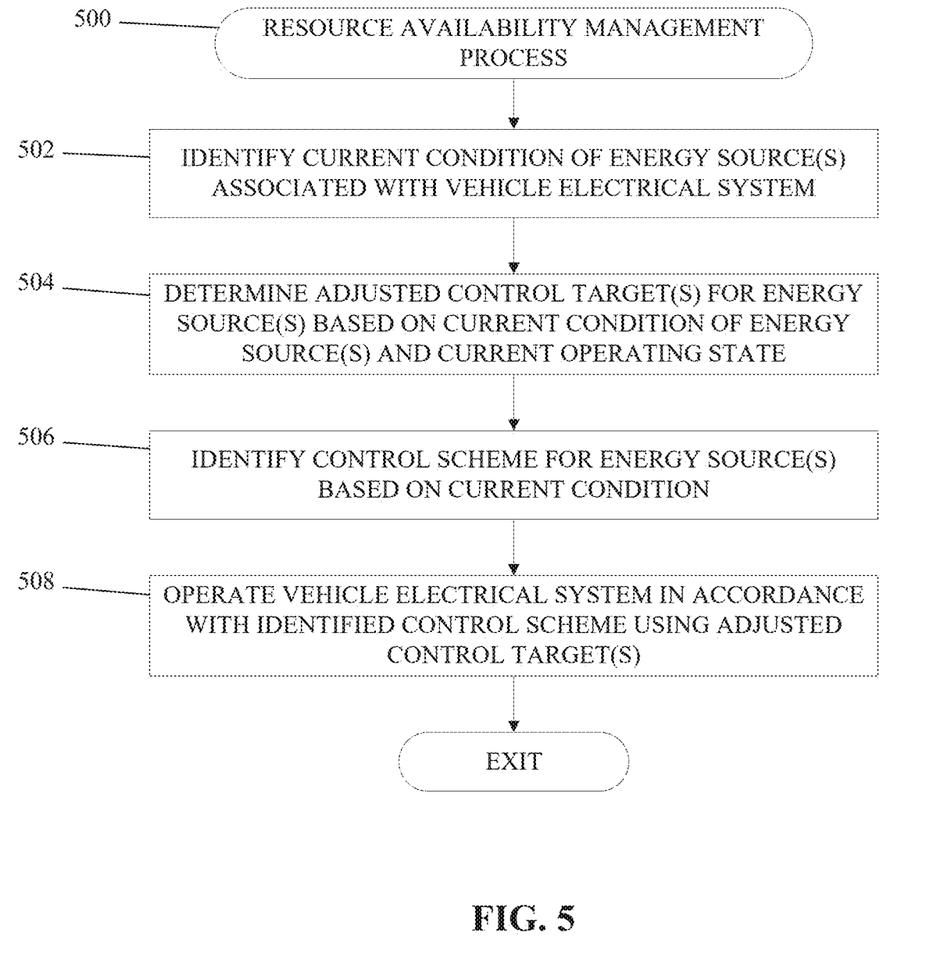
FIG. 5 depicts a flow diagram of a resource availability management process suitable for implementation in connection with a vehicle electrical system according to one or more implementations described herein.

FIG. 5 depicts an exemplary implementation of a resource availability management process 500 suitable for implementation by one or more control modules onboard a vehicle to dynamically adjust operation of the energy source(s) associated with the vehicle electrical system in response to an anomalous condition to increase or otherwise maintain availability of the energy source(s) for subsequent operation. For illustrative purposes, the following description may refer to elements mentioned above in connection with FIGS. 1-4. While portions of the resource availability management process 500 may be performed by different elements of a vehicle system, for purposes of explanation, the subject matter may be primarily described herein in the context of the resource availability management process 500 being primarily performed by the FOPM 40, the MODACS control module 240, the battery controller 110 or another controller associated with the vehicle.

In exemplary implementations, the resource availability management process 500 initializes or otherwise begins in response to identifying or otherwise detecting an anomalous condition with respect to vehicle operation. In this regard, in some implementations, the resource availability management process 500 is triggered or otherwise initiated in response to detecting the unavailability of one or more battery strings at the energy source (e.g., one of the batteries 82, 84 or the MODACS 200) associated with the low voltage grids 12, 14 of the vehicle electrical system 10. That said, in other implementations, the resource availability management process 500 may triggered or otherwise initiated in response to an anomalous condition with respect to another component of the vehicle electrical system, such as, for example, an anomalous condition with respect to one of the APMs 32, 34.

The illustrated resource availability management process 500 identifies or otherwise determines the current status or condition of the energy source(s) associated with the vehicle electrical system at 502. In this regard, a control module or other controller associated with the vehicle identifies or otherwise determines the current number of available battery strings (or battery cells) associated with the energy source(s) (e.g., the batteries 82, 84 or the MODACS 200) associated with the grids 12, 14, or alternatively, the current number of unavailable battery strings (or battery cells) associated with the energy source(s) (e.g., due to an anomalous condition with respect to a battery cell or string). Additionally, the control module or other controller associated with the vehicle may also identify or otherwise determine one or more of the following: the current voltage of the respective electrical grids 12, 14, the current voltage output associated with the available energy sources, the current electrical current consumption associated with the respective electrical grids 12, 14, the current electrical current flowing to/from the available energy sources, the current state of health (SOH) associated with the available energy sources, the current state of charge (SOC) associated with the available energy sources, the current temperature associated with the available energy sources (e.g., via temperature sensors 112, 114), and/or potentially other measurement data or information indicative of the current state of the available energy resources (e.g., availability or health of the APMs 32, 34, the HV battery 20, and/or the like). For example, in one or more implementations, the control module of the FOPM 40 may be coupled to or otherwise include one or more sensors configured to sample or otherwise obtain measurements of the voltage associated with the respective grids 12, 14, the output voltage associated with the APMs 32, 34 and/or the current flow to/from the electrical grids 12, 14 (e.g., via the APMs 32, 34). The FOPM 40 may also receive or otherwise obtain, from a control module associated with the grid energy sources (e.g., from the MODACS control module 240, the battery controller 110, a BCM associated with the batteries 82, 84 and/or the like) indicia of the current state of the available energy sources, including the current SOC, the current SOH, the current temperature, the current voltage, the current status or availability of the strings of battery cells associated with the energy source, and/or the like.

The resource availability management process 500 continues by calculating or otherwise determining one or more adjusted control targets for the energy source(s) associated with the vehicle electrical system based at least in part on the current condition of the energy source(s) and the current operating state for the vehicle electrical system at 504. In this regard, different operating states may be defined for the vehicle electrical system in response to anomalous condition, where the different operating states sequentially progress from normal (or non-anomalous) operation of the vehicle system to progressively degraded operating states until a final degradation state where propulsive operation of the vehicle is terminated. For example, in one implementation, a sequence of six degradation states are defined for the vehicle electrical system that range from a normal operating state (DS0) where no anomalies exist to a final degradation state (DS5) where terminating propulsive operation of the vehicle is imminent. An expected duration for each anomalous degradation state (DS1-DS5) may be defined or otherwise configured by a vehicle manufacturer or other user based on various factors which are not germane to this disclosure. For example, an expected duration of 12 seconds may be defined for the final degradation state (DS5) associated with bringing the vehicle to a stop, while an expected duration of 40 seconds may be defined for the penultimate degradation state (DS4) associated with transitioning the vehicle towards stopping, and so on. In this regard, the subject matter described herein is not limited to any particular type, number, configuration or sequence of defined operating states and corresponding durations. For example, some implementations may also define peak power requirements for different degradation states or other operating states, which may vary depending on the particular application, battery size, and potentially other factors.

Based on the current operating state for the vehicle electrical system 10 and the current condition of the energy source(s), the resource availability management process 500 determines one or more adjusted control targets that are configured to maintain or increase the availability or the capability of the energy source(s) to discharge energy during subsequent operation of the vehicle, such as, for example, an adjusted SOC target value, an adjusted voltage level, and/or the like. In an exemplary implementation, the resource availability management process 500 identifies a SOC offset to be added to a target SOC value for the energy source(s) to operate the energy source(s) in a manner that is configured to increase the discharge capacity of the energy source(s). For example, the FOPM 40, the MODACS control module 240, the battery controller 110 and/or the like may include or otherwise reference a lookup table that maintains an association between a SOC offset value to be applied to the target SOC value based on the number of available battery strings (or the number of unavailable battery strings) at the respective energy source and the current operating state of the vehicle electrical system.

For example, in one example, the resource availability management process 500 may identify an SOC offset of 13% when there is an unavailable battery string and the vehicle electrical system is in the degraded operating state DS2, identify an SOC offset of 29% when there is an unavailable battery string and the vehicle electrical system is in the degraded operating state DS3, and identify an SOC offset of 50% when there is an unavailable battery string and the vehicle electrical system is in the degraded operating state DS4. In this regard, as the number of unavailable battery strings increases and/or the operating state progresses towards the final degradation state (DS5), the SOC offset value may increase to increase the energy availability for the remaining battery strings to execute operations to bring the vehicle to a stop, while a lesser SOC offset value may be utilized when there are fewer unavailable battery strings and/or the operating state is closer to a normal state (e.g., DS1 or DS2). In this regard, the subject matter described herein is not limited to any particular SOC offset values for any particular combination of string availability and operating state, and the example values provided herein are for explanatory purposes and not intended to be limiting. The identified SOC offset value may be added to or otherwise combined with a current SOC target value being employed by a control scheme associated with the energy source(s) to increase the SOC of the energy source(s) during subsequent operation. Moreover, while the subject matter may be described herein in the context of an adjusted SOC target, practical implementations may additionally or alternatively utilize an adjusted voltage target to increase the output voltage of the energy source(s). For example, a calibration table may be utilized to convert an adjusted SOC target value to a corresponding adjusted voltage level for the grids 12, 14, which, in turn, may be utilized by the FOPM 40 and/or the APMs 32, 34 to increase the voltage level of the grids 12, 14, and thereby increase the SOC of the batteries 82, 84 or the MODACS 200.

In addition to an adjusted SOC target using an SOC offset value, in one or more implementations, the resource availability management process 500 may also identify or otherwise determine an adjusted minimum battery cell temperature target value based on the relationship between the current SOH for the energy source(s) and the current operating state for the vehicle electrical system. In this regard, as the SOH decreases and/or the operating state progresses towards the final degradation state (DS5), the adjusted minimum battery cell temperature target value may increase by a greater amount to corresponding decrease the electrical resistance associated with the battery cells to better facilitate delivering full energy discharge from a less healthy energy source in a more degraded state. Conversely, at higher current SOH values and/or less degraded operating states, the adjusted minimum battery cell temperature target value may increase relative to a default or normal minimum battery cell temperature target by a lesser amount, since it is more likely the healthier energy source will be able to discharge energy and/or it is less likely full discharge will be imminently needed in a less degraded operating state. Again, it should be appreciated the subject matter described herein is not limited to any particular battery cell temperature adjustments for any particular combination of energy source condition(s) and operating state(s), and the subject matter described herein is not intended to be limited to any particular type, manner or configuration of adjustment.

Still referring to FIG. 5, after determining the adjusted control target(s), the resource availability management process 500 continues by identifying or otherwise determining the appropriate control scheme for the energy source(s) based on the current condition of the energy source(s) at 506. In this regard, depending on the current condition of the energy source(s) and the number of available (or unavailable) battery strings, the resource availability management process 500 dynamically determines which operating mode should be utilized to manage the SOC, temperature and/or other characteristics of the energy source(s) using the adjusted control target(s) determined at 504.

For example, in an exemplary implementation, when there are no unavailable battery strings (or a maximum number of battery strings available), the resource availability management process 500 identifies that cell balancing should be prioritized over heating and configures the control module associated with the grid energy source (e.g., the battery controller 110, the MODACS control module 240, and/or the like) to operate the grid energy source in a manner that balances utilization across battery cells. When there is one unavailable battery string, the resource availability management process 500 identifies that cell balancing should be in parity with the rapid heating operating mode and configures the control module associated with the grid energy source (e.g., the battery controller 110, the MODACS control module 240, and/or the like) to alternately select and activate the balanced heating operating mode, where the balanced heating operating mode utilizes the adjusted SOC target and/or the adjusted minimum battery cell temperature target value determined at 504. When there are two or more unavailable battery strings, the resource availability management process 500 identifies that cell heating should be prioritized over the balanced heating operating mode and configures the control module associated with the grid energy source (e.g., the battery controller 110, the MODACS control module 240, and/or the like) to preferentially select and activate the rapid heating operating mode over the balanced heating operating mode, where the rapid heating operating mode utilizes the adjusted SOC target and/or the adjusted minimum battery cell temperature target value determined at 504.

After identifying the desired control scheme to be utilized with the adjusted control target(s), the resource availability management process 500 continues by automatically operating the vehicle electrical system in accordance with the identified control scheme using the adjusted control target(s) at 508. In this regard, the resource availability management process 500 automatically operates the energy source(s) and/or other electrical components associated with the grids 12, 14 to facilitate achieving the adjusted SOC target and/or desired minimum cell battery temperature and ensure adequate capacity and availability to execute a high energy maneuver or other degraded state event, for example, to automatically and autonomously bring the vehicle to a stop using electrically controlled actuator devices (e.g., brakes, steering controls and/or the like). For example, the FOPM 40 and/or the APMs 32, 34 may be cooperatively configured to utilize the adjusted SOC target value and/or an adjusted voltage target value to autonomously increase the voltage level of the electrical grids 12, 14, and thereby increase the SOC and/or voltage associated with the energy source(s) coupled to the grids 12, 14 (e.g., the batteries 82, 84 or the MODACS 200). Concurrently, at the energy source(s), the battery controller 110, the MODACS control module 240, or another vehicle controller is configured to utilize the identified control scheme to manage or otherwise regulate the charging current and/or discharge current flowing to/from the energy source(s), to thereby regulate the temperature associated with the remaining available battery strings and/or balance the SOC across the remaining available battery strings. In this manner, the available energy capacity at the energy source(s) may be increased while concurrently increasing the availability or capability of the energy source (s) to discharge that increased energy capacity when needed.

For example, in response to the loss of a battery string at the MODACS 200 (e.g., one of blocks 224) that causes the vehicle electrical system 10 to enter the degradation state DS2 and trigger the resource availability management process 500, the battery controller 110 may calculate or otherwise determine an adjusted SOC target value that is 13% higher than the current or preceding SOC target value being utilized by the normal control scheme for the MODACS 200 and then command, signal or otherwise instruct the MODACS control module 240 to utilize the adjusted SOC target value while alternating between a balanced heating operating mode and a rapid heating operating mode in parity with one another. In this regard, for a control scheme where the balanced heating operating mode and the rapid heating operating mode are in parity with one another, after each sampling period or control cycle update, the MODACS control module 240 may determine which operating mode should be employed over the next sampling period or cycle based on the current cell temperatures, the current SOC of the battery cells and/or the like. For example, when the measured cell temperature associated with one or more of the battery strings (or blocks 224) is below the adjusted minimum battery cell temperature target value, the MODACS control module 240 may utilize the rapid heating operating mode with the adjusted SOC value for the next sampling period or control cycle to increase the cell temperature, which in turn, causes an imbalance across the battery strings as described above. Thereafter, for the next sampling period or control cycle, the MODACS control module 240 may utilize the balanced heating operating mode for the next sampling period or control cycle using the adjusted SOC value to improve the cell balancing, before toggling back to the rapid heating operating mode, and so on. In this manner, the resource availability management process 500 attempts to preserve cell balancing while also ensuring the temperature associated with the energy source(s) is adequate to support discharging.

In response to the loss of another battery string at the MODACS 200 (e.g., one of blocks 224) that causes the vehicle electrical system 10 to enter the degradation state DS3 and trigger the resource availability management process 500, the battery controller 110 may calculate or otherwise determine an adjusted SOC target value that is 29% higher than the preceding unadjusted SOC target value that was utilized by the normal control scheme for the MODACS 200 and then command, signal or otherwise instruct the MODACS control module 240 to utilize the adjusted SOC target value while prioritizing the rapid heating operating mode. In response, the MODACS control module 240 may employ the rapid heating operating mode described above using the adjusted minimum battery cell temperature target value and the adjusted SOC value to regulate or otherwise manage the temperature of the remaining available battery cells to a temperature that is greater than or equal to the adjusted minimum battery cell temperature target value with an SOC that is greater than or equal the adjusted SOC value. Thus, in the event one or more actuator devices (e.g., one or more of the loads 50, 60, 70) need to be autonomously operated to bring the vehicle to a stop, the MODACS 200 is more likely to be capable of fully discharging the required amount of energy by virtue of the increased energy capacity at the MODACS 200 provided by the adjusted SOC along with the decreased internal resistance achieved by regulating the temperature of the battery strings of the MODACS 200 to achieve a cell temperature above a desired minimum battery cell temperature to facilitate efficient discharge.

In some implementations, in addition to adjusting the control target(s) and control scheme for the energy source(s) associated with the grids 12, 14, in some implementations, the resource availability management process 500 automatically adjusts operation of one or more of the electrical loads 50, 60, 70 on the grids 12, 14 based on the current condition of the energy source(s) and/or the current operating state associated with the vehicle electrical system 10. In this regard, the battery controller 110, the MODACS control module 240, or other vehicle controller implementing or supporting the resource availability management process 500 may dynamically identify or otherwise determine when one or more loads 50, 60, 70 should be paused, terminated or deactivated to limit current flow to/from the loads 50, 60, 70 while an energy source is operated to increase capacity and/or availability. For example, in response to the loss of a battery string at the MODACS 200 (e.g., one of blocks 224) that causes the vehicle electrical system 10 to enter the degradation state DS2, the battery controller 110, the MODACS control module 240, or other vehicle controller may set a flag bit or provide another indicator configurable to notify one or more of the loads 50, 60, 70 to stop consuming or requesting power from the grids 12, 14 for a particular period of time. In this regard, in some implementations, the resource availability management process 500 may be configured to temporarily pause one of more lower priority loads 50, 60, 70 while the operating the energy source(s) in accordance with the identified control scheme at 506 using the adjusted control target(s) identified at 504 until detecting the energy source(s) have achieved the adjusted SOC target, the adjusted voltage target and/or the adjusted minimum battery cell temperature before removing the flag to allow the lower priority loads 50, 60, 70 to resume operation. That said, in response to loss of another battery string or progression into a more degraded operating state, the resource availability management process 500 may be configured to terminate the lower priority load(s) 50, 60, 70 or otherwise maintain operation of the lower priority load(s) 50, 60, 70 in a low power state for the remaining duration of operation of the vehicle until the current condition of the energy source(s) and/or the current operating state of the vehicle electrical system 10 is restored to an unimpaired state.

By virtue of the resource availability management process 500, the SOC and/or voltage of the batteries 82, 84 and/or the MODACS 200 can by dynamically increased in response to loss of a battery string (or block 224) to ensure that adequate power is available for high energy events or transitioning to degraded operating states where increased power demands may be imminent (e.g., to autonomously operate one or more actuator devices to bring the vehicle to a stop). In this regard, the resource availability management process 500 compensates for the loss of a battery string by increasing the capacity of the remaining battery strings. For example, in response to the MODACS control module 240 detecting or otherwise identifying a loss of a battery block 224, an adjusted SOC target value may be provided to the FOPM 40 to control operation of the APMs 32, 34 to increase the voltage of the grids 12, 14, and thereby increase the SOC of the remaining available battery blocks 224 inside the MODACS 200.

Additionally, the battery heating operating modes are reprioritized to ensure the remaining available battery strings are at least a desired minimum threshold temperature that increases discharge capability to help ensure availability of the increased power capacity for high energy events or transitioning to degraded operating states where increased power demands may be imminent. For example, when all battery strings are available, SOC balancing or other cell balancing may be prioritized (e.g., to maintain the minimum and/or maximum voltages substantially the same across the different battery strings). However, when a battery string becomes unavailable, cell temperature may be prioritized in parity with cell balancing, such that the rate of charging/discharging current flowing to/from the battery strings is controlled to regulate the cell temperature in concert with balancing the voltage and/or SOC across the battery strings. Thereafter, as additional battery strings become available or the operating state is further degraded, cell temperature is prioritized over cell balancing to ensure the cell temperature is adequate to support fully discharging energy before attempting to balance the voltage, SOC, usage and/or the like across the battery strings. In this regard, once the observed battery temperature is adequate and the ambient temperatures are unlikely to result in the battery temperature falling below a minimum threshold, the operation of the energy source(s) and/or the electrical grid(s) may revert to attempting to balance the voltage, SOC, usage and/or the like once the adequate minimum temperature is ensured.

Accordingly, the subject matter described herein increases the likelihood that the available energy source(s) will be able to meet the energy requirements for a high energy vehicle maneuver or other high energy events associated with degraded operating states where increased power demands may be imminent. By dynamically adjusting control targets and control schemes associated with the energy source(s) and/or electrical grid(s) associated with the vehicle electrical system, safe operation of the vehicle can be ensured throughout degraded operating states until the vehicle can be repaired or serviced.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing the exemplary aspect or exemplary aspects. It should be understood that various changes can be made in the function and arrangement of elements without departing from the scope of the disclosure as set forth in the appended claims and the legal equivalents thereof.

What is claimed is:

1. A method of managing a vehicle electrical system, the method comprising:
    identifying a current number of available battery strings associated with an energy source coupled to an electrical grid in response to detecting unavailability of one or more battery strings at the energy source;
    identifying a current degradation state of a plurality of degradation states associated with the vehicle electrical system;
    determining an offset for increasing a control target for the energy source based at least in part on the current number of available battery strings and the current degradation state, wherein the control target comprises at least one of a state of charge (SOC) target and a voltage target;
    determining an adjusted control target for the energy source by adding the offset to the control target to increase availability of the energy source based at least in part on the current number of available battery strings and the current degradation state, wherein the adjusted control target comprises at least one of an adjusted SOC target and an adjusted voltage target;
    identifying a control scheme for the energy source based at least in part on the current number of available battery strings associated with the energy source, the control scheme comprising a prioritization for alternating between different modes; and
    autonomously operating the vehicle electrical system in a manner that is influenced by the adjusted control target by alternating between the different modes in accordance with the identified control scheme.

2. The method of claim 1, wherein the energy source comprises a multiple output dynamically adjustable capacity storage system (MODACS).

3. The method of claim 1, further comprising automatically deactivating one or more loads coupled to the electrical grid based at least in part on the current number of available battery strings and the current degradation state while autonomously operating the vehicle electrical system in a manner that is influenced by the adjusted control target in accordance with the identified control scheme.

4. The method of claim 1, wherein autonomously operating the vehicle electrical system in a manner that is influenced by the adjusted control target by alternating between the different modes in accordance with the identified control scheme comprises preferentially operating the vehicle electrical system in a rapid heating operating mode to regulate a temperature of the available battery strings to be greater than or equal to an adjusted minimum battery cell temperature target value greater than or equal to a normal minimum battery cell temperature target when a number of unavailable battery strings associated with the energy source is greater than a threshold.

5. The method of claim 1, wherein:
    autonomously operating the vehicle electrical system comprises autonomously operating a power module to increase a voltage of the electrical grid based on the adjusted SOC target to increase an SOC of the energy source.

6. The method of claim 5, wherein:
    identifying the control scheme comprises selecting one of a balanced heating operating mode and a rapid heating operating mode based at least in part on the current number of available battery strings associated with the energy source, resulting in a selected heating operating mode; and
    autonomously operating the vehicle electrical system comprises autonomously operating the energy source in accordance with the selected heating operating mode to increase a temperature of the energy source while autonomously operating the power module to increase the voltage of the electrical grid.

7. The method of claim 1, wherein determining the adjusted control target comprises determining an adjusted minimum temperature threshold associated with the energy source.

8. The method of claim 7, wherein:
identifying the control scheme comprises prioritizing a heating operating mode; and
autonomously operating the vehicle electrical system comprises autonomously operating the energy source in accordance with the heating operating mode to increase a temperature of the energy source using the adjusted minimum temperature threshold.

9. The method of claim 8, further comprising selecting one of a balanced heating operating mode and a rapid heating operating mode based at least in part on a number of unavailable battery strings associated with the energy source, wherein autonomously operating the vehicle electrical system comprises autonomously operating the energy source in accordance with a selected one of the balanced heating operating mode and the rapid heating operating mode.

10. The method of claim 8, wherein:
autonomously operating the vehicle electrical system comprises autonomously increasing a voltage of the electrical grid based on the adjusted SOC target to increase an SOC of the energy source while autonomously operating the energy source in accordance with the heating operating mode to increase the temperature of the energy source using the adjusted minimum temperature threshold.

11. A non-transitory computer-readable medium comprising executable instructions that, when executed by a processor, cause the processor to:
identify a current number of available battery strings associated with an energy source coupled to an electrical grid of a vehicle electrical system in response to detecting unavailability of one or more battery strings at the energy source;
identify a current degradation state of a plurality of degradation states associated with the vehicle electrical system;
determine an offset for increasing a control target for the energy source based at least in part on the current number of available battery strings and the current degradation state, wherein the control target comprises at least one of a state of charge (SOC) target and a voltage target;
determine an adjusted control target for the energy source to increase availability of the energy source by adding the offset to the control target based at least in part on the current number of available battery strings condition and the current operating degradation state, wherein the adjusted control target comprises at least one of an adjusted SOC target and an adjusted voltage target;
identify a control scheme for the energy source based at least in part on the current number of available battery strings associated with the energy source, the control scheme comprising a prioritization for alternating between different modes; and
autonomously operate the vehicle electrical system in a manner that is influenced by the adjusted control target by alternating between the different modes in accordance with the identified control scheme.

12. The non-transitory computer-readable medium of claim 11, wherein the adjusted control target comprises an adjusted minimum temperature threshold associated with the energy source.

13. The non-transitory computer-readable medium of claim 12, wherein the instructions cause the processor to prioritize a heating operating mode and autonomously operate the energy source in accordance with the heating operating mode to increase a temperature of the energy source using the adjusted minimum temperature threshold.

14. The non-transitory computer-readable medium of claim 13, wherein the instructions cause the processor to select one of a balanced heating operating mode and a rapid heating operating mode based at least in part on a number of unavailable battery strings associated with the energy source and autonomously operate the energy source in accordance with a selected one of the balanced heating operating mode and the rapid heating operating mode.

15. The non-transitory computer-readable medium of claim 13, wherein the instructions cause the processor to:
autonomously increase a voltage of the electrical grid based on the adjusted SOC target to increase an SOC of the energy source while autonomously operating the energy source in accordance with the heating operating mode to increase the temperature of the energy source using the adjusted minimum temperature threshold.

16. The non-transitory computer-readable medium of claim 11, wherein the instructions cause the processor to:
autonomously operate a power module to increase a voltage of the electrical grid based on the adjusted SOC target to increase an SOC of the energy source.

17. The non-transitory computer-readable medium of claim 16, wherein the instructions cause the processor to:
identify a number of unavailable battery strings associated with the energy source;
select one of a balanced heating operating mode and a rapid heating operating mode based at least in part on the number of unavailable battery strings associated with the energy source, resulting in a selected heating operating mode; and
autonomously operate the energy source in accordance with the selected heating operating mode to increase a temperature of the energy source while autonomously operating the power module to increase the voltage of the electrical grid.

18. The non-transitory computer-readable medium of claim 17, wherein the energy source comprises a multiple output dynamically adjustable capacity storage system (MODACS).

19. A vehicle comprising:
an energy source to provide an electrical grid for a vehicle electrical system;
one or more loads coupled to the electrical grid; and
a control module coupled to the electrical grid that, by a processor, identifies a current number of available battery strings associated with the energy source in response to detecting unavailability of one or more battery strings at the energy source, identifies a current degradation state of a plurality of degradation states associated with the vehicle electrical system, determines an offset for increasing a control target for the energy source based at least in part on the current number of available battery strings and the current degradation state, wherein the control target comprises at least one of a state of charge (SOC) target and a voltage target, determines an adjusted control target for the energy source by adding the offset to the control target to increase availability of the energy source based at least in part on the current number of available battery strings and the current degradation state, wherein the adjusted control target comprises at least one of an adjusted SOC target and an adjusted voltage target, identify a control scheme for the energy source based at least in part on the current number of available battery strings associated with the energy source, the control scheme comprising a prioritization for alternating between different modes, and autonomously operate the vehicle electrical system in a manner that is influenced by the adjusted control target by alternating between the different modes in accordance with the identified control scheme.

20. The vehicle of claim 19, wherein:

the energy source comprises a multiple output dynamically adjustable capacity storage system (MODACS); and the current number of available battery strings associated with the energy source comprises a number of unavailable battery strings associated with the MODACS.

\* \* \* \* \*